E. L. HENDRICKS.
LUGGAGE CARRIER.
APPLICATION FILED APR. 15, 1918.

1,321,742.

Patented Nov. 11, 1919.

Witnesses
Le Roy Kauffman.

Inventor
E. L. Hendricks
By Victor J. Evans
Attorney.

UNITED STATES PATENT OFFICE.

EMMETT L. HENDRICKS, OF PASADENA, CALIFORNIA.

LUGGAGE-CARRIER.

1,321,742.   Specification of Letters Patent.   Patented Nov. 11, 1919.

Application filed April 15, 1918. Serial No. 228,703.

*To all whom it may concern:*

Be it known that I, EMMETT L. HENDRICKS, a citizen of the United States, residing at Pasadena, in the county of Los Angeles and State of California, have invented new and useful Improvements in Luggage-Carriers, of which the following is a specification.

This invention relates to improvements in carriers or holders for securing baggage on the running boards of automobiles, the object of the invention being to provide improved devices of this character, which are extremely simple in construction, which can be readily attached to an automobile running board, which are out of the way when not in use, and which are sightly in appearance and do not in any way disfigure the running board.

With the above and other objects in view, the invention consists in the construction, combination and arrangement of devices hereinafter described and claimed.

In the accompanying drawing.

Figure 1:
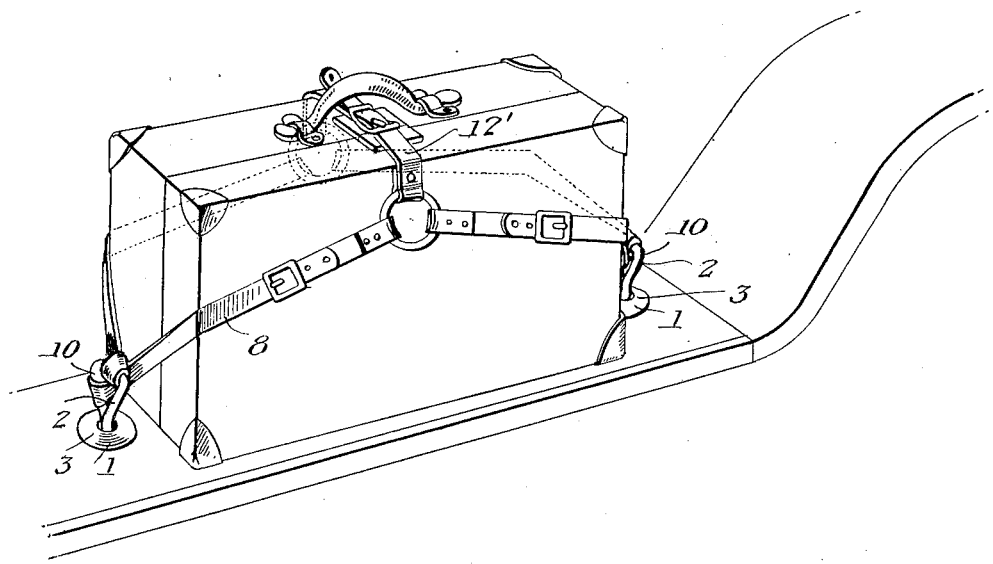
Figure 1 is a perspective view of a baggage carrier embodying my invention and showing the same arranged for use on an automobile running board.
Figure 2:
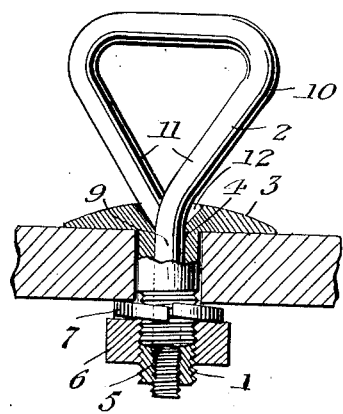
Fig. 2 is a detail elevation, partly in section, of the same, and showing the eye member attached to the bolt or anchoring member.
Figure 3:
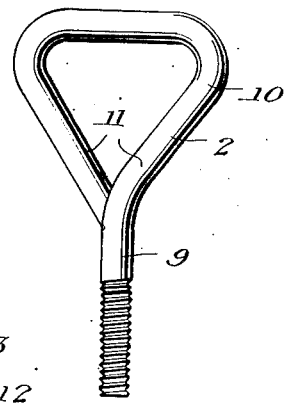
Fig. 3 is a detail elevation of the eye member.
Figure 4:
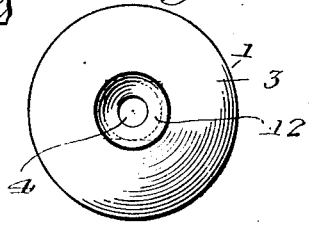
Fig. 4 is a detail plan of the bolt member.

In accordance with my invention, I provide for use on an automobile running board a pair of anchoring and attaching members each of which comprises a bolt 1 and an eye 2. The bolt is adapted to be passed through an opening in the running board and has a head 3 which bears on the top of the running board and is here shown as circular in form and is rounded on its upper surface, so that it presents a sharp circumferential edge and is out of the way, is sightly in appearance and does not in any way form an obstruction on the running board. The bolt is hollow and is provided with a bore 4 which extends therethrough from end to end and has a threaded portion 5. To secure the bolt in place on the running board, I also provide a nut 6 which is screwed on the bolt, and I preferably, and in practice, also provide a locking open spring ring 7 which bears between the nut and the lower side of the running board and the ends of which respectively engage the running board and the nut, so that the said spring ring prevents the nut from working loose and hence also prevents the bolt from becoming casually loosened.

Associated with each bolt is an eye member 2 for the attachment of a strap, cord or band 8 which passes around the sides and ends of the suit case or other luggage or box or package as the case may be. Each eye member is provided with a stem 9 which is adapted to engage in the bore of the bolt and which is threaded to engage the thread of the bore and thereby enable the eye member to be securely attached to the bolt or anchoring member and to be readily detached therefrom when desired. The eye 10 of each eye member is preferably triangular in form, as here shown, with downwardly converging sides 11 and the head of the bolt is recessed as at 12 to receive the lower portion of the eye.

The strap or band is provided with a cross strap 12, the ends of which are attached to the sides of the band 8, at points about midway between the bolts. The cross strap 12 is adjustable and for this purpose may be provided with a buckle or may be otherwise suitably constructed to enable the cross strap to be tightened as may be required over the top of the luggage and put the band 10 under such tension as to cause the band, in coaction with the bolts and attaching eyes to so securely fasten the luggage on the running board as to effectually prevent it from being displaced.

While I have herein shown and described a preferred form of my invention, I will have it understood that changes may be made in the form, proportion and construction of the several parts without departing from the spirit of my invention, and within the scope of the appended claim.

I claim:

In a luggage carrier, a headed bolt having an external thread adapted to be passed through a support with the head resting upon the latter, a nut adjustably associated with the bolt to engage the underside of said support, said bolt having a longitudinally threaded bore, an eye bolt having a threaded stem received within said bore, said eye being adapted to receive a strap, and together with said head being arranged on the end opposite the nut when the parts are assembled.

In testimony whereof I affix my signature.

EMMETT L. HENDRICKS.